United States Patent [19]
Green

[11] 3,899,273
[45] Aug. 12, 1975

[54] FOOD FORMING APPARATUS

[75] Inventor: Glen R. Green, Ontario, Oreg.

[73] Assignee: Ore-Ida Foods, Inc., Boise, Idaho

[22] Filed: July 23, 1973

[21] Appl. No.: 381,876

[52] U.S. Cl. ................ 425/62; 425/186; 425/193; 425/241; 425/310
[51] Int. Cl. ............................................ A21c 5/04
[58] Field of Search .......... 425/220, 195, 193, 241, 425/183, 186, 188, 239, 310, 62, 99; 83/411 R, 699; 17/32

[56] References Cited
UNITED STATES PATENTS

| | | | |
|---|---|---|---|
| 839,941 | 1/1907 | Lutze | 425/241 X |
| 1,328,025 | 1/1920 | Wheeler | 425/62 X |
| 1,678,747 | 7/1928 | Scholz | 425/62 X |
| 1,846,659 | 2/1932 | Roehl et al. | 425/231 X |
| 2,488,046 | 11/1949 | Werner et al. | 425/311 |
| 2,552,027 | 5/1951 | Bird et al. | 425/DIG. 55 |
| 2,915,994 | 12/1959 | Wilcox | 425/195 |
| 3,205,837 | 9/1965 | Fay | 425/99 |
| 3,279,936 | 10/1966 | Forestek | 425/DIG. 55 X |
| 3,408,962 | 11/1968 | Nishimura | 425/240 |
| 3,561,372 | 2/1971 | Vogt | 425/292 X |

*Primary Examiner*—Francis S. Husar
*Assistant Examiner*—David S. Safran
*Attorney, Agent, or Firm*—Mallinckrodt & Mallinckrodt

[57] ABSTRACT

Improved apparatus for forming selectively shaped foodstuffs and the like. A cylindrical molding drum is provided having a plurality of mold cavities in the surface thereof. Each mold cavity includes passageways at the base thereof passing from within to without the drum. Each mold cavity is adapted to receive an inherently lubricous mold insert means having a head portion conforming to the configuration of a mold. Each mold insert includes appendages depending from the mold insert head portion and adapted to pass through said passageways in a mold cavity and engage reciprocal activation means within the drum in a fashion whereby each of said mold cavity inserts may reciprocally move in its respective mold cavity.

15 Claims, 11 Drawing Figures

FIG. 6
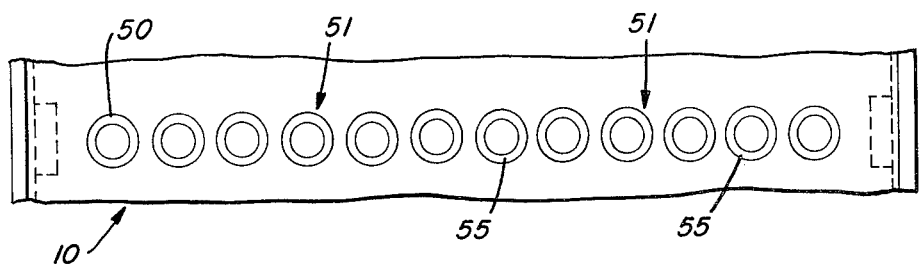
FIG. 5
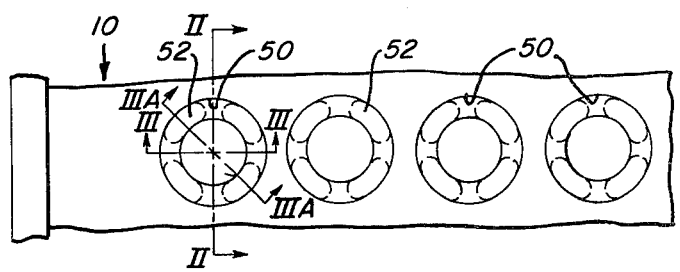
FIG. 4
FIG. 3A
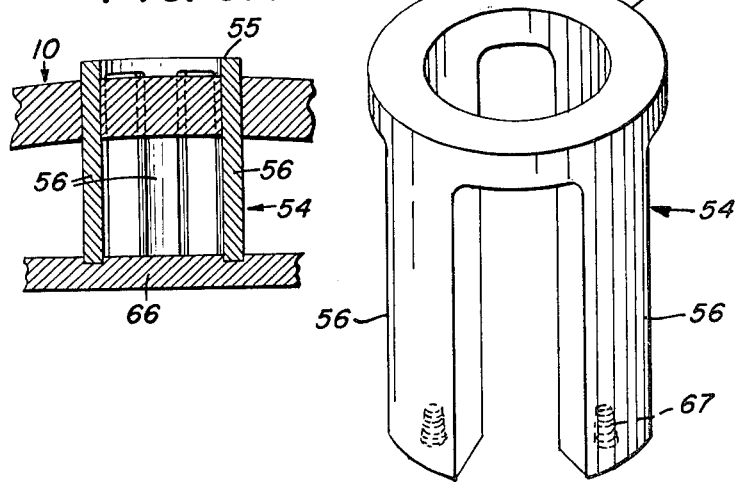
FIG. 3B
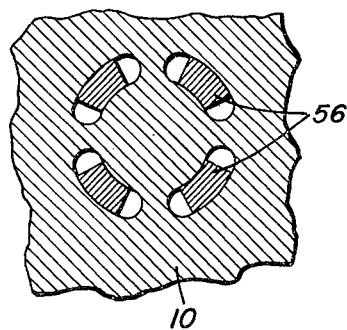

FOOD FORMING APPARATUS

BACKGROUND OF THE INVENTION

A. Field of the Invention

This invention relates to apparatus for forming selectively shaped foodstuffs and the like, and more particularly to molding drum apparatus of the type described characterized by high productivity. B. Description of the Prior Art Apparatus for forming shaped foodstuff articles, such as candy bars, assorted candies, and the like, are generally well known in the art. Common among such apparatus is the rotary drum type molding apparatus wherein a drum is provided having a plurality of molding cavities at the surface thereof. The cavities may be filled as the drum rotates by passing into a plenum chamber filled with a plastic foodstuff material under pressure. The pressure, of course, forces the plastic material into a mold cavity. The drum thereafter continues rotation and a piston means within the mold cavity forces the molded material out of the cavity whereupon it may become exposed to a doctor blade or the like for scraping the molded foodstuff from the piston. Typical of such shaped foodstuff forming apparatus are those described in U.S. Pat. No. 2,915,994, and U.S. Pat. No. 2,915,993. Those patents disclose a foodstuff molding or forming apparatus which includes a molding drum having a plurality of mold plates in the surface thereof. Each mold plate has a plurality of mold cavities cut therethrough. Plungers are provided within the molding drum which have a shape corresponding to the particular mold cavity in which each resides. Each plunger is adapted to reciprocate in a mold cavity whereby a plastic mass of foodstuff residing within the mold cavity may be expelled therefrom.

The prior art, as thus far described, has certain disadvantages. For example, the disclosed plunger means and mold cavities comprise an all-metal construction, and even though the plastic material being molded or formed may somewhat lubricate the plunger as it slides or reciprocates within a mold cavity, it is believed that heat may build up due to friction and possibly encourage bacteria formation in foodstuff remaining in the mold cavity due to imperfect discharging of shaped foodstuff. Additionally, it is possible for some of the plastic material to squeeze between the plunger and the mold cavity wall and thus enter the inner portion of the molding drum. Without thorough and oft-repeated cleanings this again may create a favorable environment for bacteria growth. This is especially so when the plastic material is being formed under very high productivity conditions. Thus, where the machine is to be run over a long period of time without shutdown for cleaning, resterilization, or the like, the disadvantages mentioned become major areas of concern. Additional rotary drum forming apparatus is disclosed in U.S. Pat. Nos 3,205,837; 2,000,027; 2,656,797; 1,724,827; 2,651,808; 2,317,541; and 2,317,574.

SUMMARY OF THE INVENTION

This invention provides improved apparatus for forming selectively shaped foodstuffs and the like which overcomes the disadvantages of known forming machines as set forth hereinabove. The apparatus provided is characterized by high productivity rates, and the ability to operate over long periods of time without significant danger of any harmful bacteria build-up in or around the mold cavities of the machine. Moreover, the invention provides a high-productivity forming machine having molding components which are readily accessible for rapid and efficient cleaning and sterilization thereof. Additionally, the apparatus provided includes a mold cavity construction of an improved and simplified nature when compared to known apparatus, and is especially advantageous where the formed product is to have a toroidal or ring shape. Additional advantages of the invention will become apparent as this specification proceeds.

A cylindrical molding drum, preferably of a heavy gauge stainless steel construction, is provided having a plurality of spaced-apart mold cavity rows in the surface thereof. Each mold cavity row includes a plurality of laterally spaced-apart individual mold cavities located in a line substantially parallel to the axis of the molding drum. In one instance each mold cavity is machined into the surface of the molding drum, and in a most preferred instance, each comprises a substantially circular mold cavity. Each mold cavity includes passageways at the base thereof passing from within to without the drum. Each mold cavity is adapted to receive an inherently lubricous mold insert means having a head portion conforming to the configuration of a mold. Suitable lubricous compositions include polyethylene, polypropylene, butadiene-styrene polymers and copolymers and like compositions. Each mold insert includes appendages depending from the mold insert head portion and adapted to pass through said passageways in a mold cavity and engage reciprocal activation means within the drum in a fashion whereby each of said mold cavity inserts may reciprocally move in its respective mold cavity. The molding drum of the apparatus provided is pivotally mounted whereby the molding drum may be readily moved into and out of sealing contact with a plenum chamber adapted to bear a plastic foodstuff material under pressure. In a most preferred instance, means such as spring means are provided for positively urging sealing contact between molding drum and foodstuff-bearing plenum chamber. Other details and advantages of the invention will become apparent by reference to the appended drawings and as the following more detailed description of certain preferred embodiments thereof proceeds.

BRIEF DESCRIPTION OF THE DRAWINGS

FIG. 3A is a fragmentary vertical section taken along the line III A — III A of FIG. 5 and drawn to a larger scale;

FIG. 3B is a fragmentary horizontal section taken along the line III B — III B of FIG. 2 and drawn to a larger scale;

FIG. 4 is an isometric view of one of the mold inserts shown in the foregoing Figures;

FIG. 5 is a fragmentary plan view showing a portion of the periphery of the molding drum of the preceeding Figures and illustrating port means for receiving the mold inserts of FIG. 4;

FIG. 6 is a view similar to that of FIG. 5, but drawn to a reduced scale and illustrating an entire mold cavity row;

DESCRIPTION OF THE PREFERRED EMBODIMENTS

Figure 1:
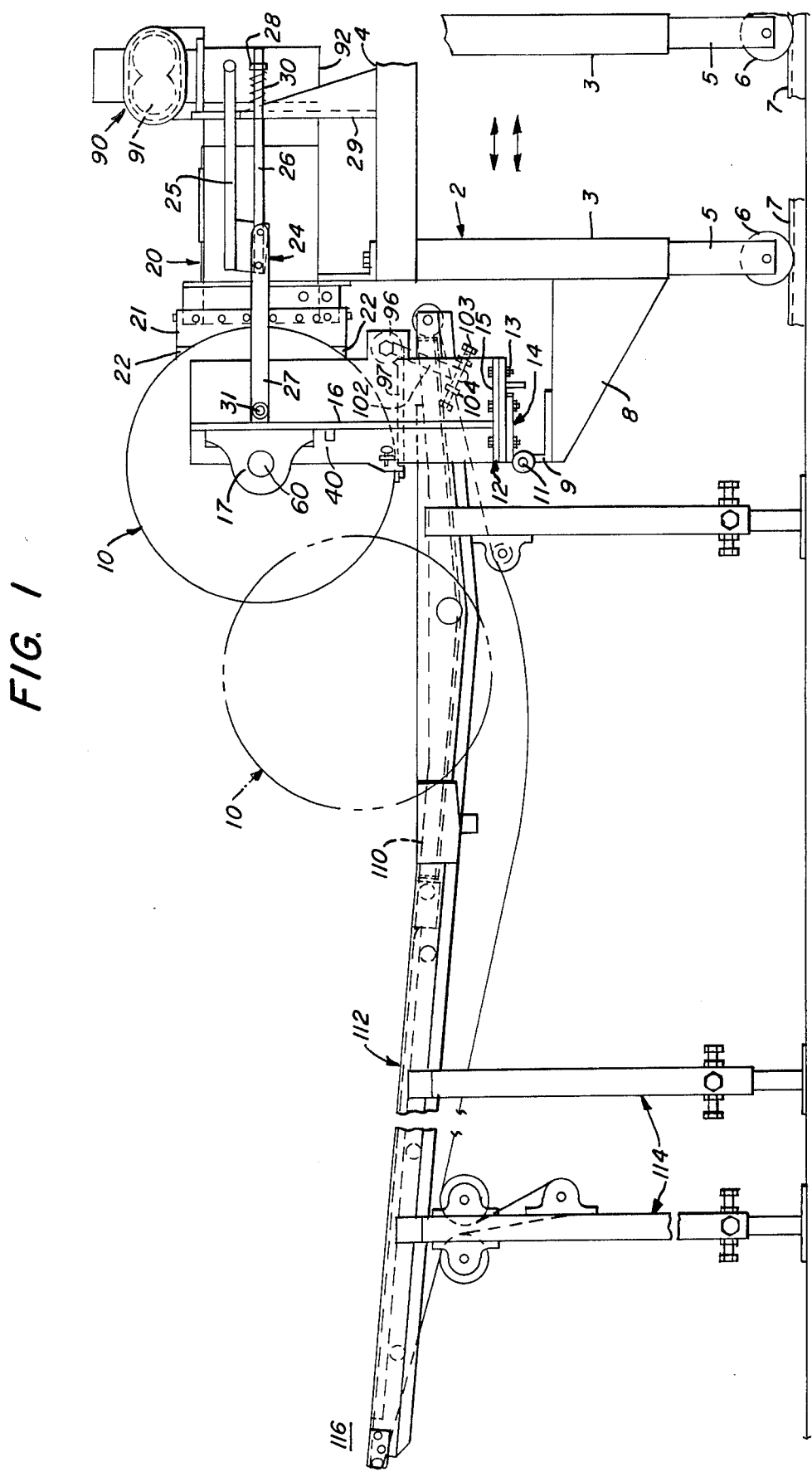
FIG. 1 is a side elevation of apparatus embodying the invention.

With reference now to FIG. 1, apparatus useful in the invention is illustrated in side elevation. The apparatus there shown includes a rigid framework 2 having operably mounted thereon a molding drum 10 sealably abutting a plenum feed section 20 adapted to receive and maintain a supply of plastic foodstuff material to be processed in the apparatus of the invention. Framework 2 includes spaced-apart legs 3 depending downwardly from a platform section 4 thereof. Each leg 3 includes a telescoping mast portion 5 of conventional design to permit raising and lowering of the upper portion of frame 2 to selected fixed vertical levels whereby the framework and attendant processing equipment may be properly heightaligned. Framework 2 heightaligned. additionally provided for horizontal movement, and, to that end, the telescoping mast portion 5 of each downwardly depending leg 3 has a conventional wheel 6 or the like adapted to travel on a suitable rail means 7. In that fashion frame 2, bearing molding drum 10 and plenum feed means 20, may be selectively moved toward and away from attendant processing equipment. As will be more clearly seen hereafter, the horizontal portability of framework aids in the efficient and rapid cleaning and sterilizing of the apparatus whenever necessary or desired.

Framework 2, as illustrated in FIG. 1, includes angular gussets 8 rigidly affixed, e.g. as by welding, to forward downwardly depending legs 3. Gussets 8 are adapted to support a heavy angle 9 through which molding drum 10 is ultimately operably borne by framework in pivotal fashion through hinge pins 11 journaled thereon. A presently preferred construction therefor is illustrated in FIG. 1 wherein a sole plate assembly 12 is provided at each end of the drum, each comprising a plurality of plates rigidly interconnected by suitable means, e.g., bolts 13. Thus, a lowermost plate 14 is attached to a hinge pin 11 and has bolted thereto an uppermost plate 15. Uppermost plate 15 includes, rigidly affixed thereto, a vertically extending member 16 which additionally constitutes a web extending normal to cam mounting plate 40 (more fully described hereafter). Web 16 serves as a mount for a bearing means 17 in which the axial shaft 60 of rotating molding drum 10 is journaled. In that fashion, rotating foodstuff forming drum 10 may be pivoted away from plenum feed section 20, as is shown in phantom in FIG. 1, whereby the apparatus may be readily opened to maximum accessibility for cleaning and repair work.

Rotating motion may be provided for rotating drum 10 in a conventional fashion. For example, a standard electric motor and gear reducer may be provided at either end of the drum shaft near a journal bearing 17 for imparting rotating movement to the molding drum 10.

Plenum feed section 20 is adapted to sealingly abut molding or forming drum 10 in a fashion whereby plastic foodstuff within the forward portion of such plenum feed section 20 will not leak from therein. To that end, plenum feed section 20 includes a plenum chamber 21 having somewhat resilient, inherently lubrous facing strips 22 adapted to abut the surface of rotating drum 10. A preferred composition for facing strips 22 comprises polyethylene, a tough, somewhat resilient composition. In that fashion, leakage of plastic foodstuff out of the plenum is discouraged.

Means are also provided for positively urging plenum feed section 20 into sealing contact with molding drum 10 and for maintaining that sealing contact during operation of the apparatus. In the apparatus illustrated, a spring-loaded, over-center lock 24 is provided preferably at each end of molding drum 10. An over-center lock 24 includes a lever arm 25 doubly hingedly connected to a spring-loaded rod 26 and a bifurcated rod pair 27. Bifurcated rod pair 27 is, in turn, hingedly attached to web 16 at hinge 31 while spring-loaded rod 26 is operably set in a spring-trap formed of a nut or collar 28 thereon and a rigid vertically extending member 29 on frame platform 4. When over-center lock is in locked position, as shown in FIG. 1, a spring 30 is in maximum compression in the spring trap thus formed and maintains plenum feed section 20 in sealing contact with rotating molding drum 10. Release of over-center lock 24 by raising lever 25 will allow molding drum 10 to pivot away from plenum feed section 20 about hinge pins 11, as shown in FIG. 1, to permit access between rotating drum 10 and plenum feed section 20 for cleaning and the like.

Figure 2:
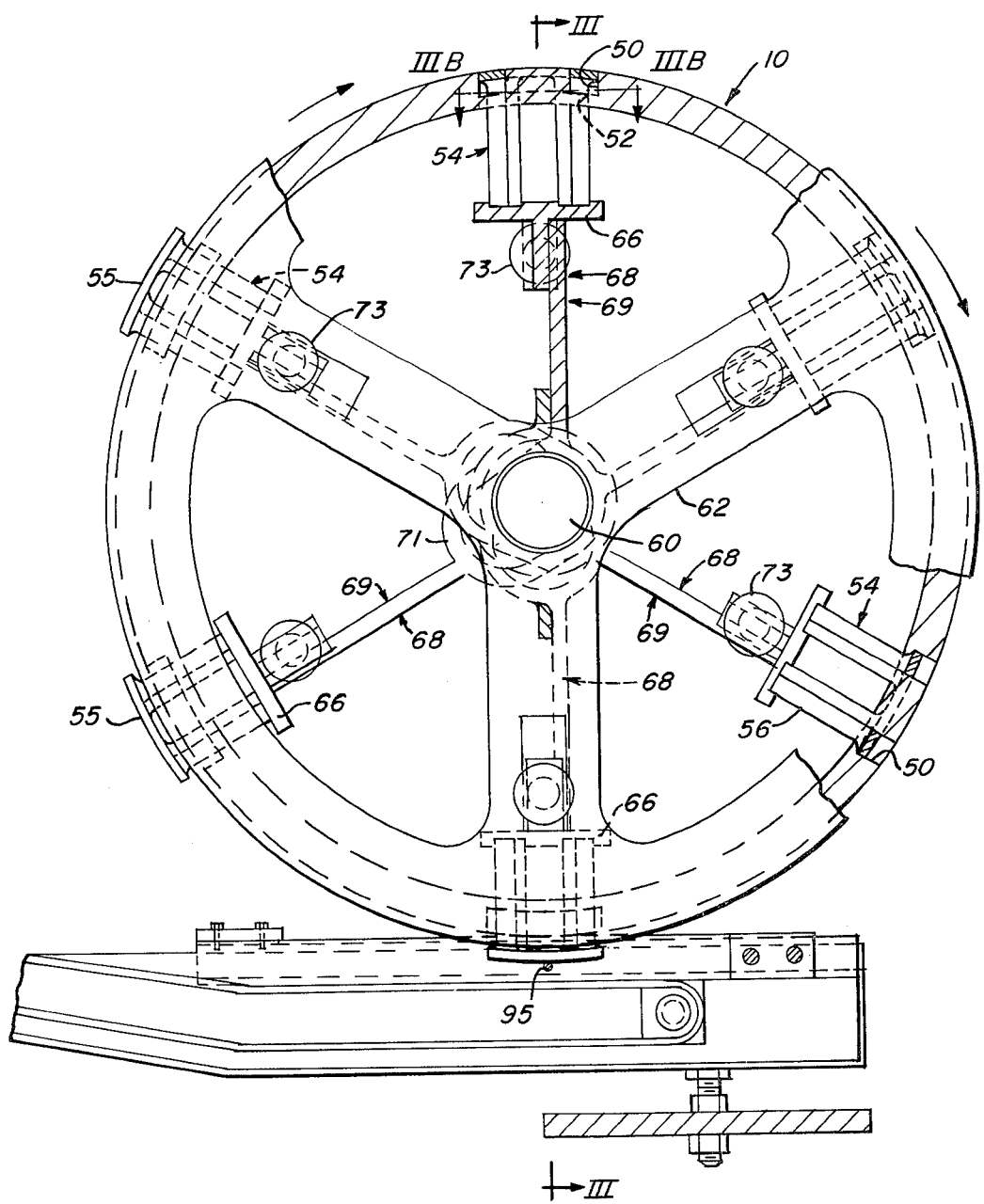
FIG. 2 is an end elevation, partly in vertical section, of the molding drum in the apparatus of FIG. 1, the section being taken axially with respect to the mold cavities and mold inserts concerned (see II—II of FIG. 5) and the other mold cavities and inserts being indicated by broken lines.

In FIG. 2 an illustrative partially exploded view through a molding drum 10 is shown. There a molding drum 10 is shown having a plurality of circumferentially spaced-apart mold cavities 50 formed in the surface thereof. Each mold cavity 50 there illustrated constitutes a member of a spaced-apart mold cavity row 51 (FIG. 6) extending axially along the surface of molding drum 10. A mold cavity 50, as illustrated in the figures, has a circular plan, thus constituting a mold cavity for forming circular-shaped plastic foodstuff. Each mold cavity 50 is open at the exterior surface of the drum and includes passageways 52 at and spaced around the base thereof and extending from within to without the mold cavity, that is to say, extending into the interior of the drum. Passageways 52 are best seen in FIG. 5. Passageways 52 are adapted to receive a corresponding plurality of depending appendages of a mold insert 54 having a head portion 55 conforming to the configuration of a mold cavity 50. A mold insert 54 is shown in perspective in FIG. 4 and comprises a somewhat resilient in and inherently lubricous composition, most preferably selected from polyethylene, polypropylene, butadiene-styrene copolymers and like compositions. Head portion 55 generally conforms to the configuration of a mold cavity 50 whereby said head portion slidably engages said mold cavity to form an effective sidewall seal between a cavity 50 and the interior of molding drum 10. In the apparatus of the figures, head portions 55 of mold inserts 54 have a ring plan conforming to a mold cavity plan for forming foodstuffs having a toroidal configuration. It should be understood, however, that otherwise shaped foodstuffs may be formed in apparatus of the invention by varying mold cavity and insert head portion dimensions.

Figure 3:
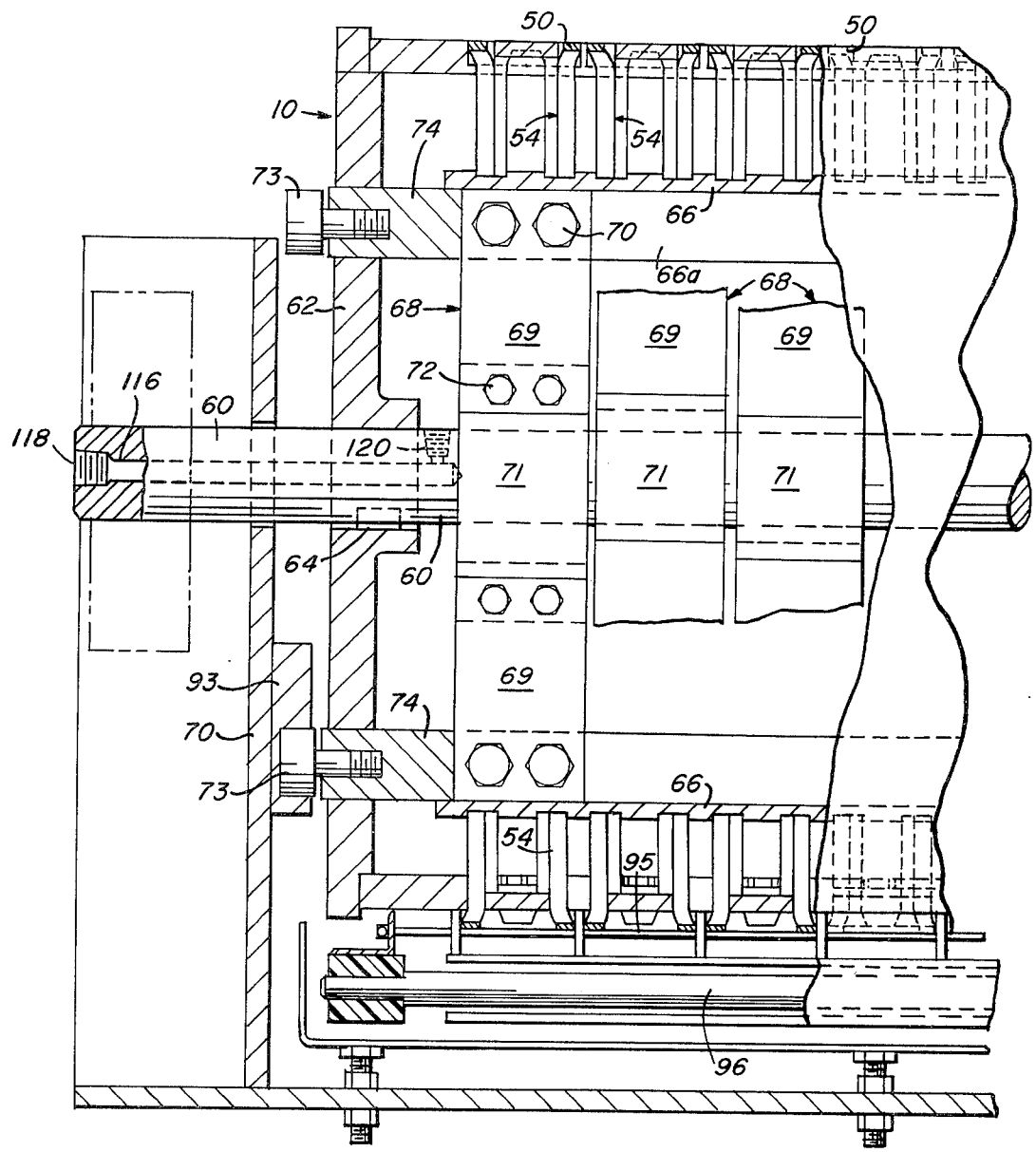
FIG. 3 is a fragmentary vertical section taken along line III—III of FIGS. 2 and 5.

The internals of molding drum 10 are best seen in FIGS. 2 and 3 wherein illustrative longitudinal and end view sections of the molding drum per se are shown. The molding drum is operably mounted upon a rotary shaft 60, e.g., as by key-locking a drum hub 62 with an appropriate key means 64 whereby rotation of shaft 60 produces corresponding rotation of drum 10. Each mold insert 54 in a mold cavity row 51 is fixedly attached to means for providing reciprocal motion thereto. To that end, each mold insert 54 includes downwardly depending appendages 56 adapted to pass through a set of the passageways 52 that establish communication of mold cavity 50 with the interior of molding drum 10. Appendages 56 of the mold inserts for any given row are adapted to fixedly engage a reciprocating T-bar 66 which extends substantially the length of molding drum 10.

Mold inserts 54 may be fixed to a T-bar 66 in conventional fashion. Preferably, a T-bar 66 is drilled and the downwardly extending appendages 56 of a mold insert 54 are tapped, whereby screws 67 (FIG. 4) may be employed to fasten mold inserts 54 to the T-bar.

Each T-bar 66 is a member of a pair of operably interconnected T-bars. The members of a T-bar pair are spaced apart 180° out of phase within circular molding drum 10. The members of a pair are operably interconnected by means of a metallic arm or strap assembly 68. Each strap assembly or arm 68 includes a straight portion 69 rigidly attached, as by bolts 70, FIG. 3, to the base 66a of a T-bar 66, and an arcuate portion 71 which essentially loosely circumscribes rotating drum shaft 60. Each assembly or arm 68 comprises a pair of metallic straps including straight portion 69 and arcuate portion 71 joined, as by bolts 72, to form a completed strap assembly operably interconnecting a pair of spaced-apart opposed T-bar assemblies 66.

Each T-bar thus interconnected is, in turn, operably interconnected to cam means for imparting the desired reciprocal motion thereto, and, hence, the desired reciprocal motion to mold inserts 54 in mold cavity 50 while mounted upon the T-bar assemblies. To that end, cam followers 73 are provided for each of the T-bars 66. Each cam follower 73 is preferably threaded into a cam follower holding block 74 which is fixedly attached to a respective T-bar 66, as by bolting or welding. Cam followers 73 are, of course, adapted to follow a cam track of appropriate design for imparting the desired reciprocal motion to a T-bar assembly and, hence, to mold inserts 54 in a mold cavity row 51.

The cam assembly details will be described hereafter and it should be remembered that, in a preferred instance, identical cam assemblies are provided at both ends of molding drum 10 for providing utmost accuracy in the reciprocal motion of a mold insert 54.

Figure 7:
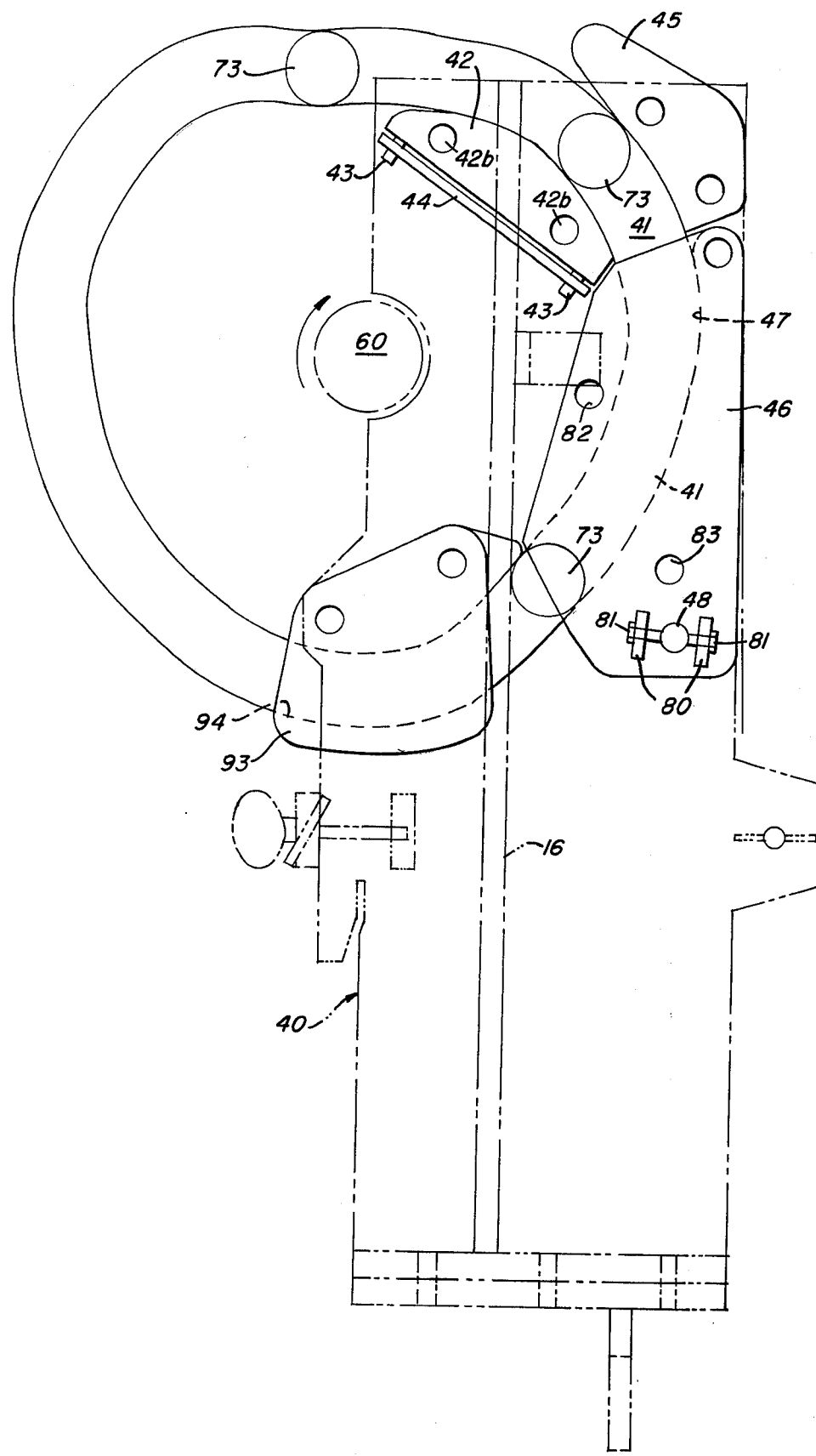
FIG. 7 is an elevation illustrating an adjustable cam and cam follower means for imparting reciprocal movement to the mold inserts in the molding drum.
Figure 8:
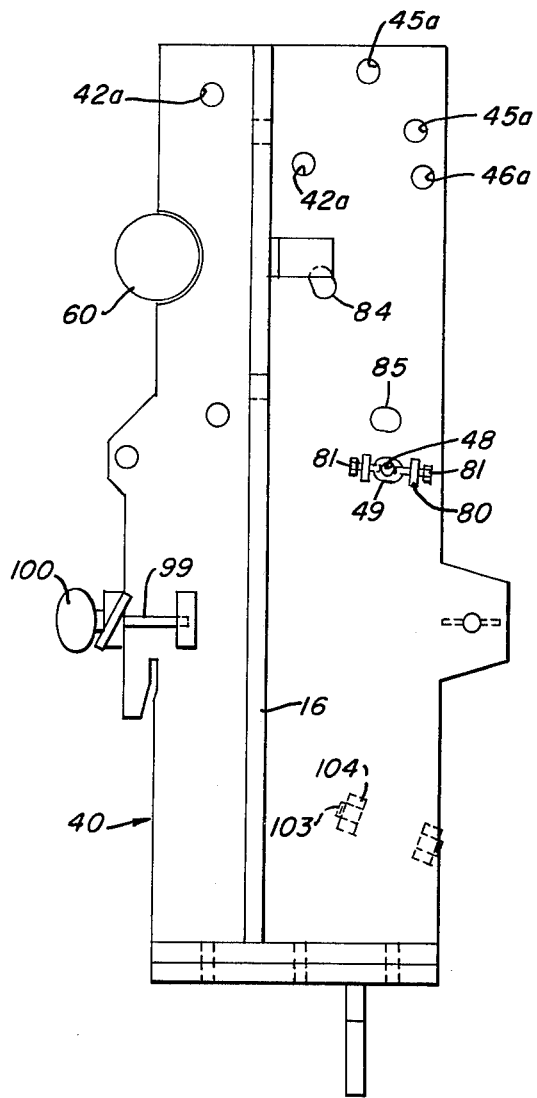
FIG. 8 is a view of the cam mounting plate per se as shown in phantom in FIG. 7.

In FIGS. 7 and 8, a cam mounting plate 40 is illustrated upon which the various cam mechanisms may be fixed. A plurality of cam plates are mounted on cam mounting plate 40 to define a cam track 41 over which cam followers 73 may travel to provide the desired reciprocal motion to T-bars 66 and hence to the mold inserts 54 residing thereon. A first cam plate 42 is bolted, to cam mounting plate 40. Bolts pass through appropriate aligned bores 42a in cam mounting plate 40 and, thereafter, into threaded corresponding tap holes 42b in cam plate 42 per se. Additional stability is lent to first cam plate 42 by means of set screws 43 passing through threaded bores in a plate 44, fixed as by welding to cam mounting plate 40. Set screws 43 bear upon first cam plate 42. Additional stability is desired in first cam plate 42 as it is the first cam plate encountered by respective cam followers 73 as they engage the cam piston in their clockwise rotation into the working portion of the cam system.

A second cam plate 45 is bolted to cam plate 40 through bores 45a, and, in cooperation with first cam plate 44, defines the lead section of cam track 41. A third cam plate 46 is next provided below adjacent cam plates 42 and 45. Cam plate 46 has cut therein a cam track section 47 for further defining over-all cam track 41 in the cam system.

In the apparatus of the invention, it is most preferred that a cam adjustment means be provided whereby the degree of reciprocation of a mold insert 54 in a mold cavity 50 may be selectively variable with respect to the depth within the cavity to which a mold insert may be withdrawn. The reason for this is essentially that the depth to which a mold insert 54 is withdrawn into a mold cavity 50 defines the amount of moldable plastic foodstuff which will be formed in each mold cavity of the apparatus. To that end, cam track portion 47 of cam track 41 defines the low point, or maximum drop of a cam follower 73, and hence of a mold insert 54. Further provided are adjustment means whereby the maximum drop of a follower 73 in cam track section 47 may be variably selected. In the embodiment shown in the figures, a post or stud 48 is provided rigidly affixed, as by threading or welding, to cam plate 46. Cam plate 46 may pivot about a bolt installed in bore hole 46a (FIG. 8). Stud 48 may thereby move within slot 49 in cam mounting plate 40 to a selected, desired location to provide the desired maximum withdrawal of a mold insert 54 in mold cavity 50. Cam plate 46 is first pivoted to the desired location and is thereafter fixed in the desired location by suitable locking means. For example, opposed nuts 80 having set screws 81 passing therethrough are provided fixedly mounted on plate 40. Set screws 81 are adapted to advance through nuts 80 and engage stud 48 to thereby maintain and set cam plate 46 in its preselected location. Cam plate 46 is further secured in position by tightening the bolt in bore 46a and by tightening bolts in bores 82 and 83 and slots 84 and 85 provided in cam plate 40. Bolts in bores 82 and 83 pass through their respective slots and into appropriate threaded taps therefor in cam plate 46. In that fashion, variable reciprocation of cam followers 73, and hence maximum withdrawal of mold inserts 54 in their respective mold cavities 50, is attained, whereby the amount of product withdrawn from plenum feed chamber 21 is selectively controlled. Precision control of product withdrawal is especially important in high-production forming apparatus such as that provided in the invention. Even a very small variation in maximum fall of a cam follower in cam track 41 is significantly reflected over a period of time and machine productivity.

In operation of the described apparatus, molding drum 10 rotates in a clockwise fashion. During rotation, the respective mold inserts 54 are worked by the cam system into the positions illustrated in FIG. 2. There, each member of three pairs of ganged and opposed T-bars 66 carry rows of mold inserts spaced 60° apart within cylindrical molding drum 10. Although it is believed that operation of the machine as thus far described is apparent to one skilled in the art, it will be helpful at this point, for purposes of illustration, to describe the action of a mold insert 54 in a mold cavity row as it reciprocates during rotation of drum 10. As a cam follower 73 enters cam track 41, a mold insert 54 operably connected therewith is initially forced outwardly of the axis of drum 10. The outward movement is predetermined such that head portion 55 of the insert is brought substantially flush with the cylindrical surface of rotating drum 10 at a point on its circumference at which the mold insert passes into plenum feed section 20 at facing strip 22 thereof (at about 30°). It is necessary that head portion 55 be flush with the drum surface at this point to avoid the trapping of air in the mold cavity which can result in a non-uniform product.

After mold insert 54 has passed into the plenum feed section which, of course, is filled with a pressurized mass of plastic foodstuff, a fall in cam track 41 causes mold insert 54 to withdraw inwardly of drum 10 to thereby permit mold cavity 50 to become filled with plastic foodstuff. It may be noted here that in the apparatus of the instant invention a "side" feed is especially preferred. In molding viscous masses of plastic foodstuff, such as a viscous matrix including chopped onions, it is necessary that the pressures in plenum feed chamber 20 be high enough to ensure complete filling of mold cavities 50. To that end, there is provided a primary or initial feed hopper 90 having spaced-apart serrated feed rollers 91, rotation of which may forcibly feed a viscous plastic mass vertically downwardly into a secondary feed section 92 in communication with plenum 20. Secondary feed section includes an auger or screw (not shown) for horizontally advancing the plastic mass into plenum 20. In a most preferred instance, a double-auger horizontal feed is employed wherein a pair of side-by-side feed screws operating together forcibly advance the plastic mass into forcible contact with drum 10.

Continued rotation of drum 10 brings filled mold cavity 50, with mold insert 54 in its most withdrawn position, out of plenum 20 (at about 120°). Thereafter, cam follower 73 encounters a lowermost cam plate 93 having cam track section 94 cut therein. Cam track section 94 and cam track section 47 immediately preceding define a sharp rise followed by a flat dwell. As cam follower 73 passes thereover, mold insert 54 is forced out of mold cavity 50 whereby a molded plastic foodstuff, here circular in shape, is exposed apart from molding drum 10. At this point (about 180°) cut-off wire means are provided for removing or slicing molded product from a mold insert 54. To that end a cut-off wire 95 is provided suspended at a depth beneath molding drum 10 whereby rotation of drum 10 will result in molded product being sliced from a mold insert 54 as cut-off wire 95 passes between mold insert head portion 55 and molded product thereon.

Figure 9:
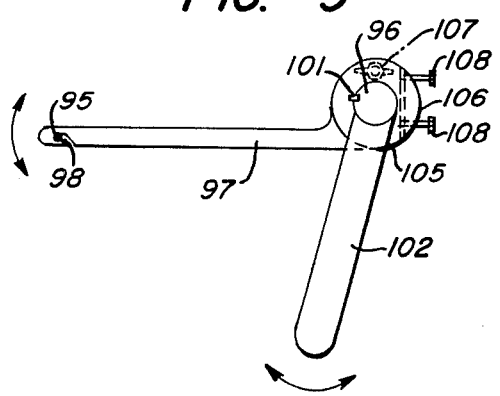
FIG. 9 is a detailed view in elevation of the adjustable cut-off wire mechanism for removing a formed plastic foodstuff from the molding drum of FIGS. 1–6.

Means are additionally provided for vertically varying the position of cut-off wire 95 to accommodate variations in mold insert reciprocation and the like. A rotatable shaft 96 extending axially of drum 10 includes a plurality of arms 97 extending therefrom (FIG. 9). Arms 97 include respective eyelets 98 at the ends thereof, which eyelets are located substantially at 180° with respect to rotating drum 10. Cut-off wire 95 is strung through the eyelets and is tightly secured therein by winding about an appropriate spool means, 99, FIG. 8, by turning grip 100 therefor. Preferably, a plurality of interconnected axially extending arms 97 are provided along the length of drum 10. A first or lead arm 97 may be provided affixed to cam mounting plate 40 with others located along shaft 96 at intervals along its length beneath drum 10. Each arm 97 is keyed to shaft 96 by means of keys 101. A coarse vertical positioning of cut-off wire 95 may be set by rotating shaft 96 to a desired position, e.g., by means of lever 102 attached operably thereto, and thereafter locking lever 102 in position as by advancing set screws 103 in spaced-apart nuts 104.

In the preferred instance, shown in FIG. 9, individual arms 97 may be provided with a fine-adjustment means. In that case, arm 97 terminates in the rotatable section of a split washer having a keyed section 105 and a rotatable section 106. The two washer sections are held snugly together by a bolt 107 passing through a slot in rotatable section 106 and into a threaded tap in fixed washer section 105. Adjustment of screws 108 results in rotation of arm 97, and hence vertical positioning of cut-off wire 95 at a particular location along the cut-off wire path.

With reference now to FIG. 1, a processing line useful in connection with the apparatus of the invention is there shown. Molded products sliced from a mold insert 54 may fall upon an endless processing belt or conveyor 110 suspended within a suitable framework 112 which is, in turn, supported by appropriate standards or pillars 114, all in conventional fashion. The processing line defined thereby may include any of several stations prior to a product's leaving the discharge end 116 thereof. For example, where a fried product is desired, processing stations may include breading, battering, frying, freezing and like stations.

When using the invention with certain foodstuffs, it may be desirable to cool the drum to inhibit bacterial growth and the possibility of food contamination. To allow for such cooling by the use of water introduced into the drum, a hole 116, FIG. 3, may be provided in shaft 60, having a fitting 118 for connection to a water supply. An interior fitting 120 is provided for connection to a system for passing the water around the mold cavities and inserts for cooling. Such a system is beyond the scope of the present invention, and is therefore not shown in the drawings.

The foregoing has described apparatus according to the invention, and it will become apparent to those skilled in the art that certain variations may be made therein without departing from the invention. For example, mold cavities 50 as described are machined into the surface of molding drum 10. It is evident that a mold cavity 50 may be formed in a stainless steel blank of simple geometry, e.g., circular, and thereafter affixed, e.g., as by shrink-fitting, into an appropriate bore therefor in the surface of molding drum 10.

Accordingly, the foregoing has described the invention and certain preferred embodiments thereof. It is to be expressly understood, however, that the invention is not limited to the precise embodiments disclosed therein, but may be variously practiced within the scope of the following claims.

I claim:

1. In an apparatus for forming shaped foodstuffs, the combination comprising:

a. a frame;

b. a cylindrical molding drum rotatably mounted on the frame and having a series of mold cavities formed therein, each mold cavity being open at the exterior surface of the drum and including a plurality of passageways at and spaced around the base thereof and extending into the interior of the drum;

c. inherently lubricous mold inserts disposed in the respective mold cavities, each insert having a head portion conforming to the configuration of its mold cavity and slidable therein to form an effective sidewall seal, and appendages depending from the head portion and through said passageways, each insert being mounted for controlled reciprocal movement between an extreme retracted position within the mold cavity for receiving foodstuff in the mold cavity and an extreme extended position beyond the mold cavity for discharging shaped foodstuff from the mold cavity;

d. a plenum chamber mounted on the frame for containing foodstuff to be formed and for cooperating with an arcuate portion of the periphery of the drum in sealing relationship therewith, whereby each mold cavity is filled as it passes into communication with the plenum chamber and its mold insert moves into said retracted position;

e. means for rotating the drum so as to bring the mold cavities into and out of communication with the plenum chamber; and f. means for controllably reciprocating the mold inserts into and out of said retracted and extended positions as the drum rotates into and out of communication with the plenum chamber.

2. The apparatus for forming shaped foodstuffs as defined in claim 1 wherein the mold cavities are machined into the surface of the molding drum.

3. The apparatus for forming shaped foodstuffs as defined in claim 1 wherein each mold cavity has a substantially circular cross section.

4. The apparatus for forming shaped foodstuffs as defined in claim 3 wherein each mold cavity has a ring-shaped cross section whereby foodstuffs formed therein are of a toroidal configuration.

5. The apparatus for forming shaped foodstuffs as defined in claim 1 wherein the mold inserts are formed from a material selected from the group consisting of butadiene-styrene copolymers, polyethylene, polystyrene, and copolymers thereof.

6. The apparatus for forming shaped foodstuffs as defined in claim 1 wherein the molding drum is pivotally mounted so as to be readily moved into and out of sealing contact with the plenum chamber.

7. The apparatus for forming shaped foodstuffs as defined in claim 6 including means for positively urging sealing contact between the molding drum and the plenum chamber.

8. The apparatus for forming shaped foodstuffs as defined in claim 7 wherein the means for positively urging sealing contact is a spring means.

9. The apparatus for forming shaped foodstuffs as defined in claim 8 wherein the spring means is an over-center lock comprising:

a. a first member hingedly connected to the molding drum;

b. a spring-loaded second member connected to the frame; and c. a lever arm double-hingedly connecting the first member to the spring-loaded second member, such that when the lever arm is in a first position, the molding drum is positively urged into sealing contact with the plenum chamber, and when the lever arm is in a second position, the molding drum may be pivoted away from the plenum chamber.

10. The apparatus for forming shaped foodstuffs as defined in claim 1 including resilient, inherently lubricous sealing strips, attached to the plenum chamber and adapted to abut the surface of the molding drum, to provide for sealing contact between the plenum chamber and the molding drum during rotation of the drum.

11. The apparatus for forming shaped foodstuffs as defined in claim 10 wherein the sealing strips are formed from a material selected from the group consisting of butadiene-styrene copolymers, polyethylene, polystyrene and copolymers thereof.

12. The apparatus for forming shaped foodstuffs as defined in claim 1 including a rail means and wherein the frame is rollably mounted on the rail means.

13. The apparatus for forming shaped foodstuffs as defined in claim 1 including a foodstuff cut-off means comprising:

a. a shaft extending parallel to the axis of the drum;

b. a plurality of arms extending perpendicularly from the shaft; c. a wire secured to each of the arms at the end of the arm away from the shaft, such that the wire extends essentially parallel to the shaft and the axis of the molding drum, at a predetermined distance from the drum corresponding to the distance of protrusion of the inserts from the drum in their extended position, whereby the wire separates the shaped foodstuff from each extended insert as the drum rotation moves the insert past the wire;

d. means for adjustment of the distance of the wire from the molding drum by rotation of the shaft; and e. means connected to each arm for fine adjustment of the distance between the molding drum and the wire at selected points along the length of the wire.

14. The apparatus for forming shaped foodstuffs as defined in claim 1 wherein the means for controllably reciprocating the inserts comprises:

a. reciprocating members located in the drum and connected to the inserts;

b. cam followers connected to the reciprocating members and controlling the movement thereof;

c. adjustable cam means for controlling the movement of the cam followers; and d. means for adjusting the cam means so as to vary the movement of the inserts during the portion of rotation of the drum when the mold inserts are in communication with the plenum chamber, so as to determine the quantity of foodstuff taken into the mold cavity, which adjustment means includes fine adjustment means for precision control of such amount of foodstuff.

15. The apparatus for forming shaped foodstuffs as defined in claim 14 wherein the reciprocating members are operably interconnected in pairs, each member of a pair being spaced apart and 180° out of phase from the other member of the pair, each member having detachedly mounted thereto a plurality of inserts in a row.

* * * * *